United States Patent
Jin et al.

(10) Patent No.: US 10,665,834 B2
(45) Date of Patent: May 26, 2020

(54) BATTERY MODULE

(71) Applicant: LG Chem, Ltd., Seoul (KR)

(72) Inventors: Hee-Jun Jin, Daejon (KR); Sung-Won Seo, Daejeon (KR); Yoon-Koo Lee, Daejeon (KR); Eun-Ah Ju, Daejeon (KR); Jeong-O Mun, Daejeon (KR); Mi-Geum Choi, Daejeon (KR)

(73) Assignee: LG Chem, Ltd., Seoul (KR)

( * ) Notice: Subject to any disclaimer, the term of this patent is extended or adjusted under 35 U.S.C. 154(b) by 0 days.

(21) Appl. No.: 15/980,242

(22) Filed: May 15, 2018

(65) Prior Publication Data

US 2018/0337376 A1 Nov. 22, 2018

(30) Foreign Application Priority Data

May 16, 2017 (KR) .................. 10-2017-0060564

(51) Int. Cl.
*H01M 2/10* (2006.01)
*H01M 2/20* (2006.01)
*H01M 10/6554* (2014.01)
*H01M 10/04* (2006.01)
*H01M 10/647* (2014.01)
*H01M 10/613* (2014.01)
(Continued)

(52) U.S. Cl.
CPC ....... *H01M 2/1077* (2013.01); *H01M 2/1022* (2013.01); *H01M 2/206* (2013.01); *H01M 10/0413* (2013.01); *H01M 10/482* (2013.01); *H01M 10/613* (2015.04); *H01M 10/647* (2015.04); *H01M 10/6554* (2015.04); *H01M 10/0436* (2013.01); *H01M 10/625* (2015.04); *H01M 2220/20* (2013.01)

(58) Field of Classification Search
CPC ............ H01M 2/1077; H01M 2/1022; H01M 10/6554; H01M 10/482; H01M 10/647; H01M 2/10
See application file for complete search history.

(56) References Cited

U.S. PATENT DOCUMENTS

2007/0184341 A1* 8/2007 Yoon .................. H01M 2/0207
429/152
2011/0183183 A1 7/2011 Grady et al.
(Continued)

FOREIGN PATENT DOCUMENTS

JP 2015-069872 A 4/2015
JP 5835315 B2 12/2015
(Continued)

*Primary Examiner* — Stewart A Fraser
(74) *Attorney, Agent, or Firm* — Morgan, Lewis & Bockius LLP

(57) ABSTRACT

Disclosed is a battery module, which comprises a cell assembly including a plurality of battery cell groups, in each of which a plurality of battery cells respectively having protrusions protruding in a left and right direction on at least one of one end and the other end thereof are stacked in an upper and lower direction, wherein the protrusion of any one battery cell group among the plurality of battery cell groups is inserted and coupled between the protrusions of another battery cell group, wherein a step is formed between adjacent battery cell groups in an upper and lower direction; and end plates respectively disposed at upper and lower portions of the cell assembly.

12 Claims, 8 Drawing Sheets

(51) Int. Cl.
*H01M 10/48* (2006.01)
*H01M 10/625* (2014.01)

(56) References Cited

U.S. PATENT DOCUMENTS

| | | | | |
|---|---|---|---|---|
| 2014/0099527 | A1* | 4/2014 | Seong | H01M 2/1077 |
| | | | | 429/120 |
| 2014/0141311 | A1 | 5/2014 | Michelitsch | |
| 2016/0133892 | A1* | 5/2016 | Uhm | H01M 2/1022 |
| | | | | 429/163 |
| 2019/0280353 | A1* | 9/2019 | Takahashi | H01M 10/647 |

FOREIGN PATENT DOCUMENTS

| | | |
|---|---|---|
| KR | 10-0882701 B1 | 2/2009 |
| KR | 10-1349205 B1 | 1/2014 |
| KR | 10-2014-0042850 A | 4/2014 |
| KR | 10-1586201 B1 | 1/2016 |
| KR | 10-1685102 B1 | 12/2016 |

\* cited by examiner

BATTERY MODULE

TECHNICAL FIELD

The present application claims priority to Korean Patent Application No. 10-2017-0060564 filed on May 16, 2017 in the Republic of Korea, the disclosure of which is incorporated herein by reference.

The present disclosure relates to a battery module, and more particularly, to a battery module having an accommodating space and a spacing respectively formed between a battery cell group and an end plate and between the battery cell group and a cooling plate.

BACKGROUND

Recently, the demand for portable electronic products such as notebook computers, video cameras and portable telephones has increased sharply, and electric vehicles, energy storage batteries, robots, satellites and the like have been developed in earnest. Accordingly, high-performance secondary batteries allowing repeated charging and discharging are being actively studied.

Secondary batteries commercially available at the present include nickel-cadmium batteries, nickel hydrogen batteries, nickel-zinc batteries, lithium secondary batteries and the like. Among them, the lithium secondary batteries are in the limelight since they have almost no memory effect compared to nickel-based secondary batteries and also have very low self-discharging rate and high energy density.

In recent years, secondary batteries have been widely used not only in small-sized devices such as portable electronic devices but also in medium-sized and large-sized devices such as vehicles and power storage devices. In particular, as carbon energy is getting depleted and the interest in the environment is increasing, the attention is focused on hybrid electric vehicles and electric vehicles around the world including the US, Europe, Japan and Korea. The most important component of the hybrid electric vehicles and electric vehicles is a battery pack that gives a drive power to a vehicle motor. Since the hybrid electric vehicle or electric vehicle is able to obtain a driving force of the vehicle through charging and discharging of the battery pack, the fuel efficiency is higher than that of a vehicle using only an engine, and pollutants may be reduced or substantially eliminated. For these reasons, the hybrid electric vehicles and electric vehicles are used more and more. In addition, the battery pack of the hybrid electric vehicle or electric vehicle includes a plurality of secondary batteries, and the plurality of secondary batteries are connected in series and in parallel to improve capacity and power.

Meanwhile, in addition to the secondary battery, the battery pack includes various components such as a battery management system (BMS), a sensing component for measuring an electrical signal of the secondary battery, an elastic component for controlling the swelling of the secondary battery, and a coupling member for coupling plates surrounding the battery pack.

In a conventional battery pack, a plurality of battery cell groups, in each of which a plurality of secondary batteries are stacked, are arranged to configure a cell assembly, and spaces accommodating the BMS, the sensing component, the elastic component and the coupling component as described above are separately partitioned around the cell assembly.

When the conventional battery pack requires a specification for ensuring a maximum energy capacity in a narrow space, since the space is partitioned to accommodate various components around the cell assembly as described above, the energy density may be lowered.

SUMMARY

The present disclosure is designed to solve the problems of the related art, and therefore the present disclosure is directed to providing a battery module, which has an accommodating space formed between a battery cell group and an end plate so that an elastic component and a sensing component included the battery module may be accommodated therein.

In addition, the present disclosure is directed to providing a battery module, which has a spacing formed between the battery cell group and the cooling plate so that a coupling unit for coupling the end plate and the cooling plate may be disposed therein.

These and other objects and advantages of the present disclosure may be understood from the following detailed description and will become more fully apparent from the exemplary embodiments of the present disclosure. Also, it will be easily understood that the objects and advantages of the present disclosure may be realized by the means shown in the appended claims and combinations thereof.

In one aspect of the present disclosure, there is provided a battery module, comprising: a cell assembly including a plurality of battery cell groups, in each of which a plurality of battery cells respectively having protrusions protruding in a left and right direction on at least one of one end and the other end thereof are stacked in an upper and lower direction, wherein the protrusion of any one battery cell group among the plurality of battery cell groups is inserted and coupled between the protrusions of another battery cell group, wherein a step is formed between adjacent battery cell groups in an upper and lower direction; and end plates respectively disposed at upper and lower portions of the cell assembly.

Preferably, an accommodating space may be formed between the plurality of battery cells groups and the end plate due to the step.

Preferably, the battery module may further comprise an elastic component accommodated in the accommodating space and buffering a pressure applied by the volume increase of the plurality of battery cells.

Preferably, the battery module may further comprise a sensing component accommodated in the accommodating space and sensing a voltage of the plurality of battery cells.

Preferably, the battery module may further comprise a cooling plate disposed at a side surface of the cell assembly to stand in an upper and lower direction.

Preferably, the cooling plate may have a groove formed at an inner surface thereof that comes into contact with the cell assembly, and the groove may have a shape corresponding to the protrusion so that the protrusion is inserted therein.

Preferably, the battery module may further comprise a coupling unit located in a spacing formed between the end plate and the cooling plate and coupling the end plate and the cooling plate.

Preferably, a space formed between the protrusions of any one battery cell group among the plurality of battery cell groups and the protrusion of another battery cell group adjacent to the any one battery cell group may be shaped to correspond to each other.

Preferably, the protrusion may be formed to protrude further from an upper or lower end of each of the plurality of battery cells toward a center thereof.

Preferably, the protrusion may be formed so that upper and lower portions thereof are symmetric in an upper and lower direction based on a center of each of the plurality of battery cells.

According to the present disclosure, since the space for accommodating a component for controlling the swelling phenomenon and a component for sensing the battery cell is not separately partitioned at the outside of the cell assembly but these components are accommodated in an accommodating space between the battery cell group and the end plate, it is possible to improve the energy density of the battery module.

In addition, according to the present disclosure, since a component for coupling plates disposed at the case of the battery module or an outside of the battery module is not mounted to the outer side of the cell assembly but is disposed in the spacing between the cooling plate and the end plate, it is possible to improve the energy density of the battery module.

DETAILED DESCRIPTION

Figure 1:
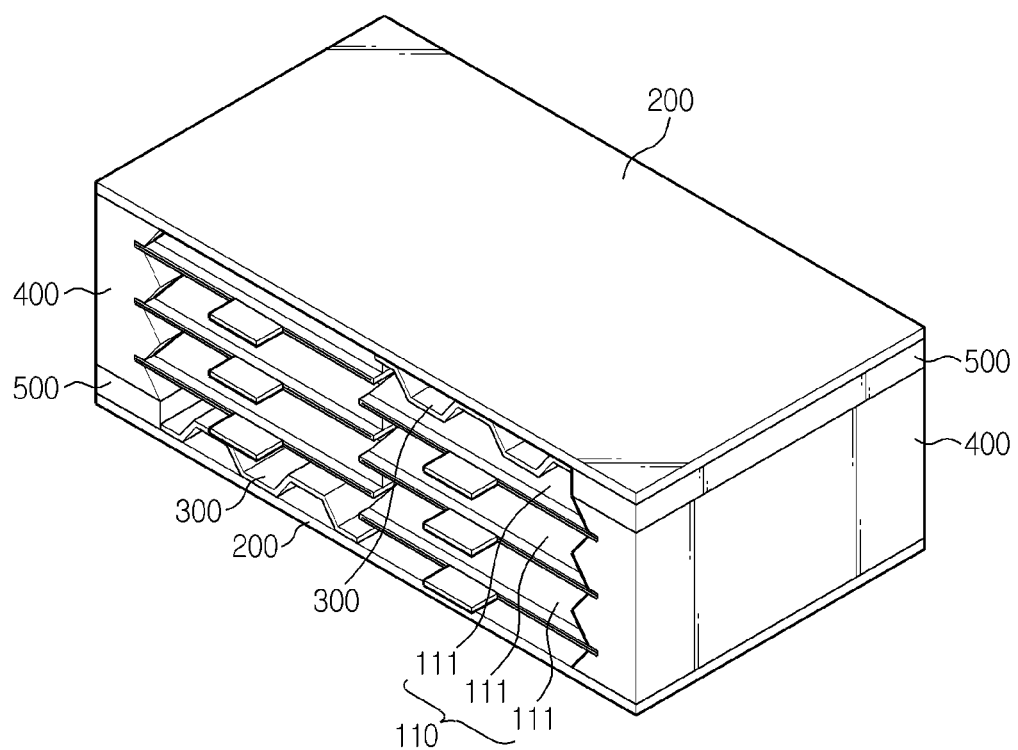
FIG. 1 is a perspective view showing a battery module according to an embodiment of the present disclosure.

The above objects, features and advantages will be described in detail below with reference to the accompanying drawings, so that those skilled in the art to which the present disclosure belongs can easily implement the technical idea of the present disclosure. In the explanations of the present disclosure, if it is deemed that any specific explanation of the related technology can unnecessarily obscure the gist of the present disclosure, the detailed explanation may be omitted. Hereinafter, a preferred embodiment according to the present disclosure will be described in detail with reference to the accompanying drawings. In the drawings, the same reference numerals are used to indicate the same or similar components.

Figure 2:
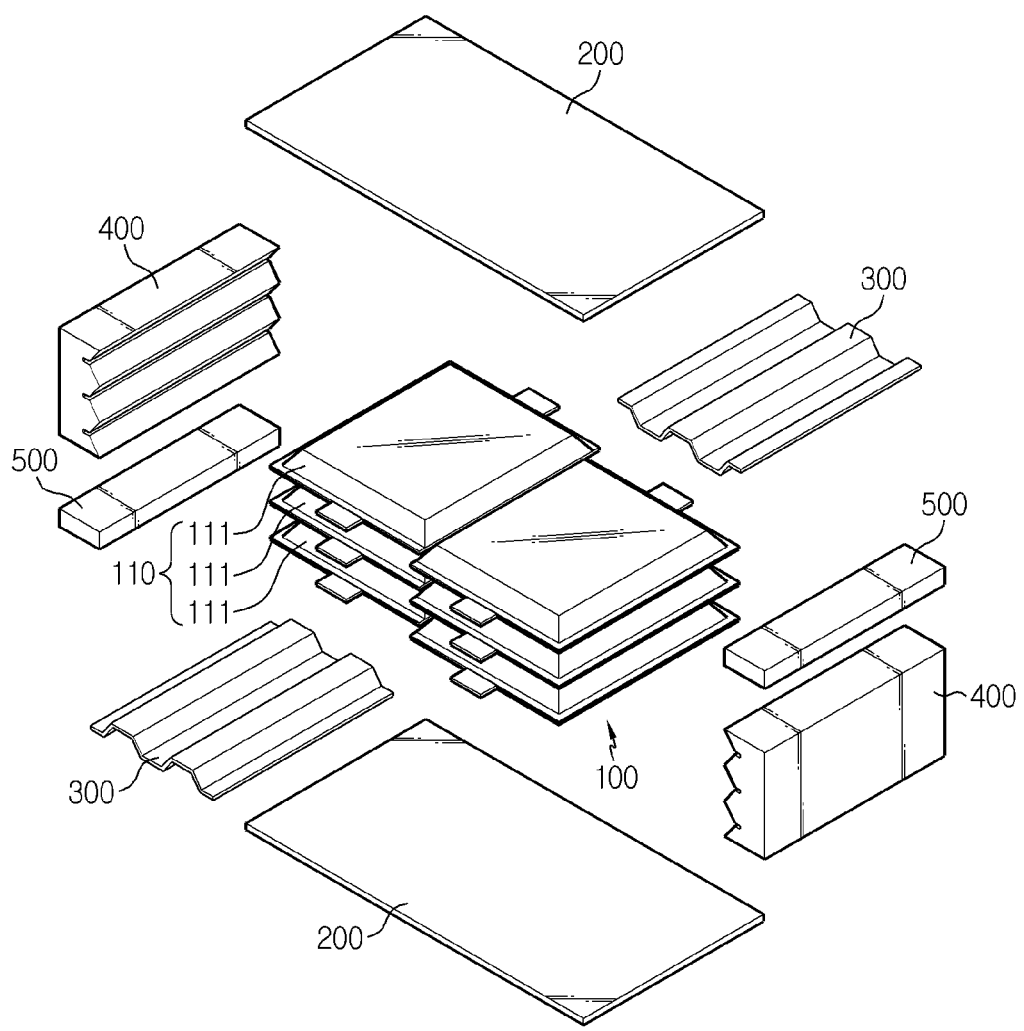
FIG. 2 is an exploded perspective view showing the battery module according to an embodiment of the present disclosure.
Figure 3:
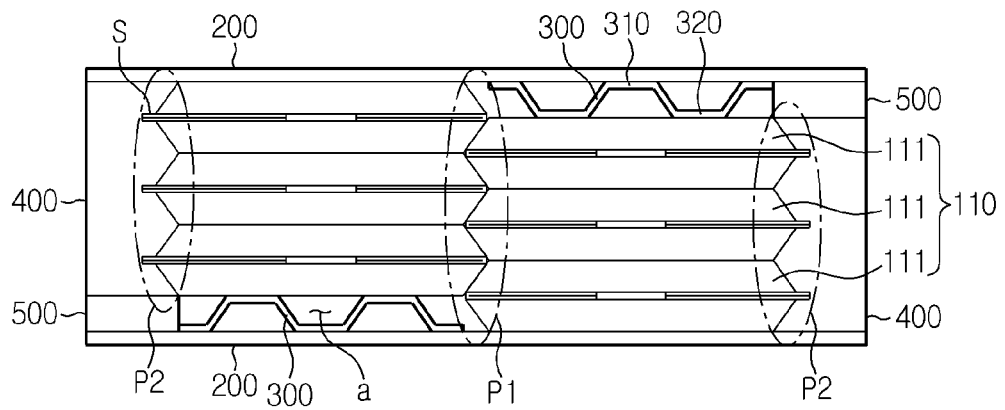
FIG. 3 is a front view showing the battery module according to an embodiment of the present disclosure.

FIG. 1 is a perspective view showing a battery module according to an embodiment of the present disclosure, FIG. 2 is an exploded perspective view showing the battery module according to an embodiment of the present disclosure, and FIG. 3 is a front view showing the battery module according to an embodiment of the present disclosure.

Referring to FIGS. 1 to 3, a battery module according to an embodiment of the present disclosure may include a cell assembly 100 and an end plate 200.

The cell assembly 100 may include a plurality of battery cell groups 110, in each of which a plurality of battery cells 111 are stacked in an upper and lower direction.

Here, each of the plurality of battery cells 111 may include protrusions P1, P2 protruding in a left and right direction on at least one of one end and the other end thereof.

In more detail, the protrusions P1, P2 of each of the plurality of battery cells 111 may be formed to protrude further from an upper or lower end of each of plurality of battery cells 111 toward a center thereof. In other words, the protrusions P1, P2 may be formed so that a center thereof protrudes further in comparison to the upper and lower ends thereof.

Each of the plurality of battery cells 111 may include an electrode assembly, an electrolyte and a pouch exterior.

Here, the electrode assembly is an assembly of the electrode and the separator, and at least one positive electrode plate and at least one negative electrode plate may be disposed with the separator being interposed therebetween.

The plurality of battery cells 111 may be configured so that the pouch exterior is sealed in a state where the electrode assembly and the electrolyte are accommodated in an inner space thereof. This will be described in more detail with reference to FIG. 4.

Figure 4:
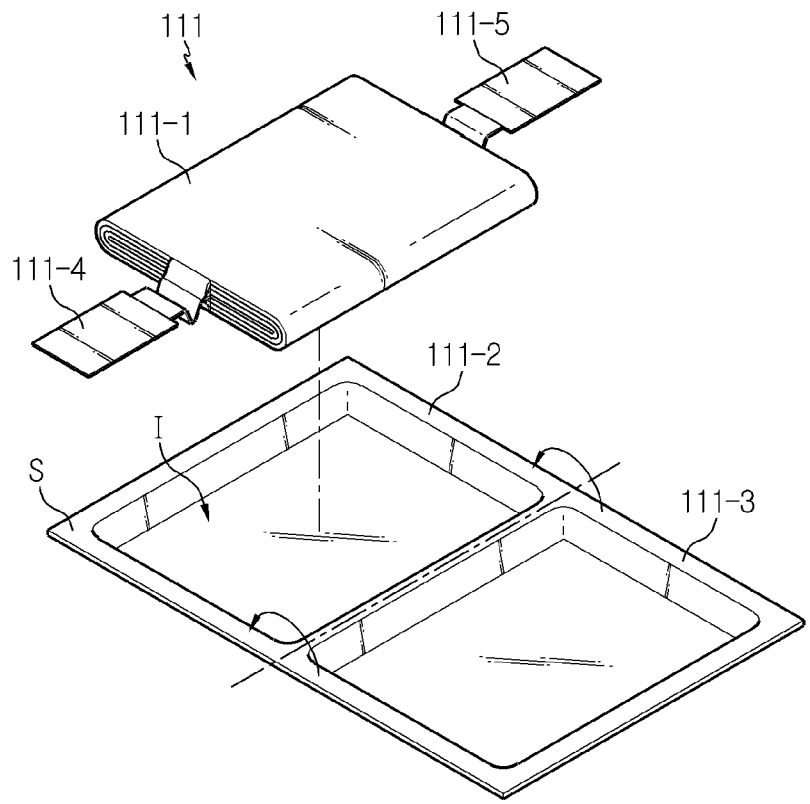
FIG. 4 is an exploded perspective view schematically showing a battery cell according to an embodiment of the present disclosure.

FIG. 4 is an exploded perspective view schematically showing a battery cell according to an embodiment of the present disclosure.

As shown in FIG. 4, the battery cell 111 may include a left pouch 111-2 and a right pouch 111-3 as the pouch exterior. At this time, the left pouch 111-2 and the right pouch 111-3 may respectively have an accommodating portion I in a concave shape. In more detail, the accommodating portion I is formed by press-molding a pouch exterior of a plate shape, and during the press-molding process, an outer circumference of the accommodating portion I may be inclined. In the accommodating portion I of the pouch, the electrode assembly 111-1 and the electrolyte may be accommodated. In addition, the left pouch 111-2 and the right pouch 111-3 may be coupled into a single body, and sealing portions S may be proved thereto, except the coupled surface of the left pouch 111-2 and the right pouch 111-3. The coupled surface of the left pouch 111-2 and the right pouch 111-3 is bent to accommodate the electrode assembly 111-1 and the electrolyte in the accommodating portion I, and the sealing portions S may be bonded by thermal bonding or the like so that the accommodating portion I is sealed in a state where the electrode assembly 111-1 and the electrolyte are accommodated therein.

Accordingly, as shown in FIG. 3, the protrusions P1, P2 of each of the plurality of battery cells 111 may protrude further from the upper and lower ends of each of the plurality of battery cells 111 toward the center thereof.

In particular, the protrusion P1 located at an outermost side of the cell assembly 100 may have a sealing portion S formed to extend and protrude outwards from the center thereof in a plate form.

On the contrary, the protrusion P2 located at an inner side of the cell assembly 100 protrudes further from the upper and lower ends thereof toward the center thereof but may not have a sealing portion S extending and protruding in a plate form, different from the protrusion P1 located at the outermost side.

Meanwhile, each electrode plate of the electrode assembly 111-1 may have an electrode tab, and at least one electrode tab may be connected to electrode leads 111-4, 111-5. At this time, the electrode leads 111-4, 111-5 of the present disclosure may include an electrode lead 111-4 protruding forwards and an electrode lead 111-5 protruding rearwards. In addition, the electrode leads 111-4, 111-5 may be interposed between the sealing portions S of the right pouch 111-2 and the left pouch 111-3 and expose out of the pouch to serve as electrode terminals of the battery cell 111.

The configuration of the battery cell 111 is obvious to those skilled in the art and thus is not described in detail here. In addition, the battery module according to the present disclosure may adopt various kinds of secondary batteries known in the art at the filing of this application.

Meanwhile, the plurality of battery cells 111 may be arranged to respectively stand in an upper and lower direction, thereby configuring the battery cell group 110.

In other words, in the battery module according to the present disclosure, the battery cell 111 may be disposed parallel to the ground so that two broad surfaces thereof are located at upper and lower sides and the sealing portions S are located at front, rear and outer sides thereof. In other words, the cell assembly 100 may be disposed in a horizontal direction so that the right pouch 111-2 and the left pouch 111-3 of the battery cell 111 are located at upper and lower sides, respectively. In addition, the battery cells 111 configured to stand as described above may be arranged parallel to each other in an upper and lower direction so that their broad surfaces face each other, thereby configuring the battery cell group 110.

Hereinafter, the coupling between the battery cell groups 110 will be described.

Figure 5:
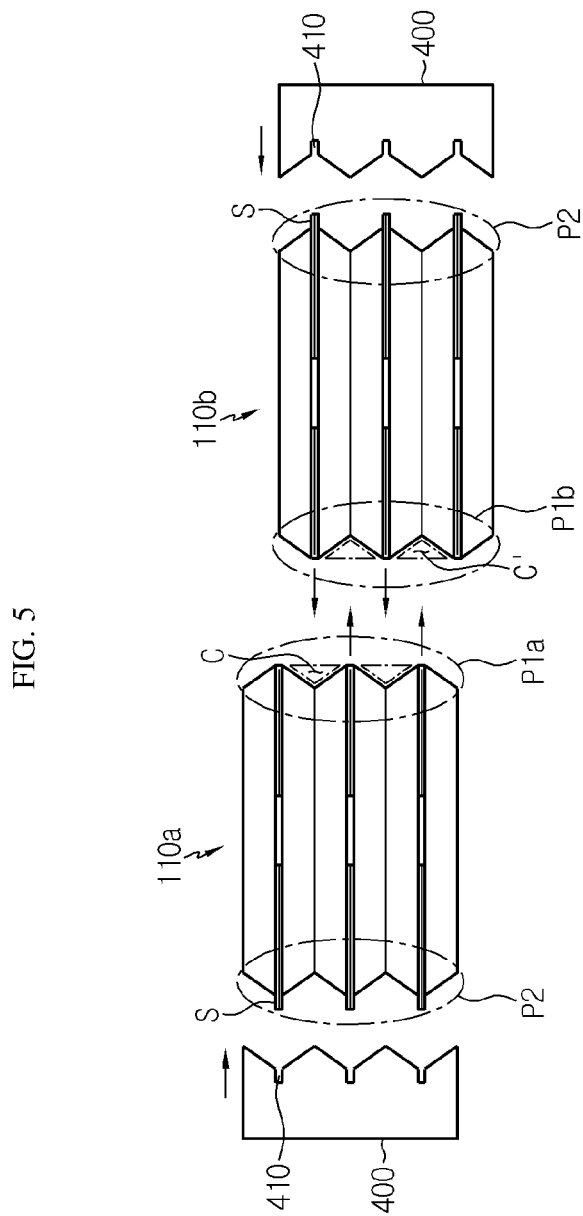
FIG. 5 is a diagram for illustrating the coupling between the battery cell groups and the coupling between the battery cell group and the cooling plate according to an embodiment of the present disclosure.

FIG. 5 is a diagram for illustrating the coupling between the battery cell groups and the coupling between the battery cell group and the cooling plate according to an embodiment of the present disclosure.

Referring to FIG. 5, a protrusion P1b of another battery cell group 110b among the plurality of battery cell groups 110a, 110b may be inserted into a space C formed between protrusions P1a of any one battery cell group 110a among the plurality of battery cell groups 110a so that the plurality of battery cell groups 110a, 110b are coupled to each other. Accordingly, the protrusion P1a formed at any one battery cell group 110a may be inserted into a space C' formed between the protrusions P1b of another battery cell group 110b among the plurality of battery cell groups 110a, 110b.

By doing so, the resistance caused by an external force applied between the plurality of battery cell groups 110a, 110b in an upper and lower direction is increased, and thus the coupling between the plurality of battery cell groups 110a, 110b may be improved.

As the protrusions P1a, P1b of the plurality of battery cell groups 110a, 110b are coupled as described above, the plurality of battery cell groups 110a, 110b may not be disposed at the same height from the ground, but a step may be generated therebetween as much as a half of the height of the battery cell included in the plurality of battery cell groups 110a, 110b.

In more detail, as shown in FIG. 5, any one battery cell group 110a among the plurality of battery cell groups 110a, 110b may be disposed higher than another battery cell group 110b as much as a half of the height of the battery cell from the ground. In addition, another battery cell group 110b among the plurality of battery cell groups 110a, 110b may be disposed lower than any one battery cell group 110a as much as a half of the height of the battery cell from the ground.

Meanwhile, the battery module according to the present disclosure may further include end plates 200.

The end plates 200 may be located at upper and lower portions of the cell assembly 100 to cover the upper and lower portions of the cell assembly 100. In particular, the cell assembly 100 may have an approximately plane shape. For example, the end plate 200 may have an approximately rectangular plate shape as shown in FIG. 2.

The end plates 200 may protect the upper and lower portions of the cell assembly 100 against external physical or chemical factors. In particular, the end plate 200 may be made of a metal material such as steel to ensure excellent rigidity.

In particular, the end plates 200 may cover the upper and lower portions of the cell assembly 100 in contact with some of the battery cell groups 110 included in the cell assembly 100. This will be described in more detail with reference to FIG. 6.

Figure 6:
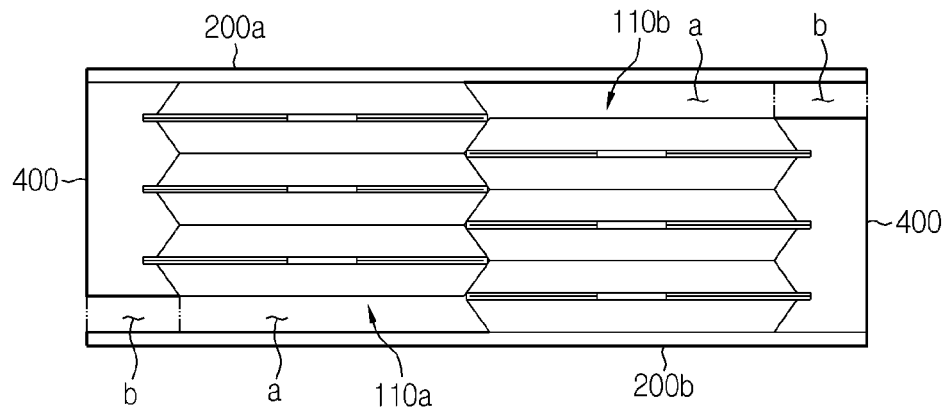
FIG. 6 is a diagram schematically showing that the end plate is coupled at the battery module according to an embodiment of the present disclosure.

FIG. 6 is a diagram schematically showing that the end plate is coupled at the battery module according to an embodiment of the present disclosure.

Referring to FIG. 6, in the end plates 200a, 200b, an upper end plate 200a located at an upper side may be in contact with an upper portion of the battery cell group 110a located at an uppermost side among the plurality of battery cell groups 110a, 110b and cover the upper portion of the cell assembly 100. In addition, in the end plates 200a, 200b, a lower end plate 200b located at a lower side may be in contact with a lower portion of the battery cell group 110b located at a lowermost side among the plurality of battery cell groups 110a, 110b and cover the lower portion of the cell assembly 100.

Accordingly, as shown in FIG. 6, between the upper end plate 200a and the battery cell group 110b located at the lowermost side, an accommodating space (a) having a step as much as a half of the height of the battery cell may be formed. In addition, between the lower end plate 200b and the battery cell group 110a located at the uppermost side, an accommodating space (a) having a step as much as a half of the height of the battery cell may also be formed.

Hereinafter, components accommodated in the accommodating space (a) will be described.

Figure 7:
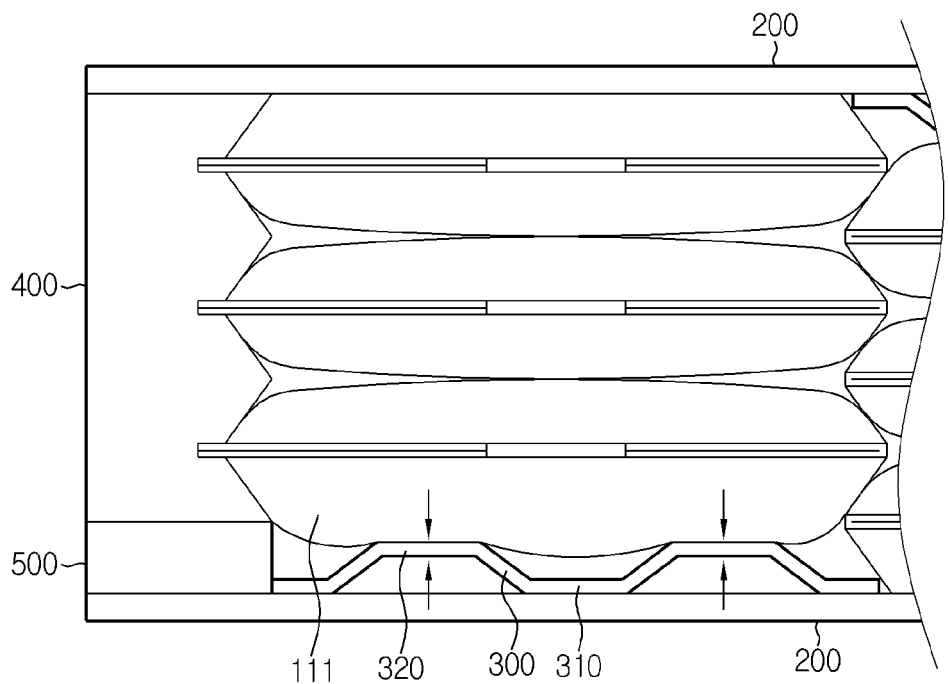
FIG. 7 is a diagram showing that swelling occurs at the battery cell of the battery module according to the present disclosure.

FIG. 7 is a diagram showing that swelling occurs at the battery cell of the battery module according to the present disclosure.

Referring to FIGS. 3 and 7, the battery module according to the present disclosure may further include an elastic component 300 and a sensing component.

As shown in FIGS. 3 and 7, the elastic component 300 may be accommodated in the accommodating space (a) described above and buffer a pressure applied due to the volume increase of the plurality of battery cells 111.

In more detail, the elastic component 300 may be provided in the accommodating space (a) formed between the battery cell group 110 and the end plate 200 and give an elastic force to the battery cell group 110 and the end plate 200. Here, the elastic component 300 of this embodiment may be elastically coupled between the battery cell group 110 and the end plate 200 to serve as an elastic body such as a left spring.

In more detail, the elastic component 300 may include a convex portion 310 and a concave portion 320 that are elastically deformable.

Here, the elastic component 300 may be configured so that the convex portion 310 and the concave portion 320 are formed alternately. If the convex portion 310 and the concave portion 320 are formed alternately, one concave portion 320 may be disposed between two convex portions 310, and one convex portion 310 may be disposed between two concave portions 320, repeatedly.

The convex portion 310 and the concave portion 320 may have a trapezoidal shape to ensure easy elastic deformation. Without being limited thereto, the convex portion 310 and the concave portion 320 may also have a semicircular shape, or the convex portion 310 and the concave portion 320 may have a triangular shape. The convex portion 310 and the concave portion 320 are not limited to these shapes and may have other shapes as long as they allow elastic deformation.

The convex portion 310 and the concave portion 320 may be in elastic contact with the end plate 200 and the battery cell group 110, respectively.

Accordingly, the elastic component 300 may be configured as an assembly made of a metal material capable of serving as a left spring, and thus the elastic component 300 is capable of controlling cell swelling of the plurality of battery cells 111.

As described above, in the battery module according to an embodiment of the present disclosure, the accommodating space (a) capable of accommodating the elastic component 300 is formed between the plurality of battery cell groups 110 and the end plate 200 by coupling the protrusions P1 of the plurality of battery cell groups 110, and thus it is possible to improve the energy density, compared to the case where the elastic component 300 is inserted between the battery cells 111 to configure a battery module.

Meanwhile, in the battery module according to the present disclosure, the sensing component may be accommodated in the accommodating space (a) described above.

In more detail, the sensing component may be accommodated in a partial accommodating space of the accommodating space (a) formed in the battery module according to the present disclosure to measure a cell voltage of the plurality of battery cells 111 and output the measured voltage value to the battery management system (BMS).

The sensing component may be composed of a current sensor, a fuse and the like in order to sense voltages at both ends of the battery cell 111, which are used for preventing overcharge or overdischarge of the battery module. In particular, the sensing component according to an embodiment of the present disclosure may include a wire for connecting a sensing terminal in contact with the battery cell 111 to a connection terminal of the BMS.

As described above, in the battery module according to an embodiment of the present disclosure, since the accommodating space (a) capable of accommodating the sensing component is formed between the plurality of battery cell groups 110 and the end plate 200 by coupling the protrusions P1 of the plurality of battery cell groups 110, a space for accommodating the sensing component is not separately formed in the battery module, thereby improving the energy density of the battery module.

Meanwhile, the battery module according to the present disclosure may further include a cooling plate 400.

As shown in FIG. 3, the cooling plate 400 may be disposed at left and right sides of the plurality of battery cell groups 110 included in the cell assembly. Thus, the cooling plate 400 may protect the cell assembly 100 against physical or chemical factors such as vibrations or moisture applied to the cell assembly 100 at the left and right sides of the battery module.

The cooling plate 400 may be made of a thermally conductive material. Thus, if heat is generated at the cell assembly 100, the generated heat may be transferred out of the battery module through the cooling plate 400. For example, the cooling plate 400 may be made of a metal material.

The plurality of battery cells 111 may be placed at an inner side of the cooling plate 400 that is oriented toward the plurality of battery cells 111. For this, a groove 410 may be formed at the inner side of the cooling plate 400 as shown in FIG. 5.

In more detail, the groove 410 having a shape corresponding to the shape of the sealing portion S may be formed at the inner side of the cooling plate 400 so that the sealing portion S of the plurality of battery cell groups 110a, 110b may be inserted therein.

In addition, the inner side of the cooling plate 400 may be formed to have a shape corresponding to the protrusions P2 of the plurality of battery cell groups 110a, 110b. In other words, an uneven structure where convex portions and concave portions are repeatedly formed to correspond to the shape of the protrusions P2 may be formed at the inner surface of the cooling plate 400. In other words, the convex portion of the cooling plate 400 may have an upper surface that is not parallel to the ground but is inclined with a slope corresponding to the protrusions P2 of the plurality of battery cell groups 110a, 110b.

Accordingly, in the plurality of battery cell groups 110a, 110b of the battery module according to the present disclosure, the sealing portion S is inserted into and supported by the groove 410 of the cooling plate 400 and is coupled thereto while contacting each other over as large area as possible, so that the plurality of battery cells 111 may be stably stacked in an upper and lower direction.

In this configuration, the heat generated from the plurality of battery cells 111 may be directly conducted to the cooling plate 400 to further improve the cooling performance, and a cooling member such as a cooling fin may not be provided between the plurality of battery cells 111 and between the plurality of battery cell groups 110a, 110b and the cooling plate 400. In this case, the volume, weight, manufacture cost or the like of the battery module may be further reduced, and the battery module may be assembled more easily.

Meanwhile, a thermal interface material (TIM) may be interposed between the cooling plate 400 and the cell assembly 100. In particular, the uneven portion may be formed at the inner side of the cooling plate 400, and the thermal interface material may be provided at the upper surface of the uneven portion. In addition, as the cell assembly 100 is placed on the cooling plate 400, the thermal interface material may be interposed between the cooling plate 400 and the cell assembly 100.

In this configuration of the present disclosure, the heat transfer effect between the cell assembly 100 and the cooling plate 400 may be enhanced by means of the thermal interface material. In particular, the air layer between the cell assembly 100 and the cooling plate 400 may be eliminated or reduced by means of the thermal interface material, and thus a large amount of heat of the cell assembly 100 may be discharged to the cooling plate 400 more rapidly. Further, the thermal interface material may be applied to the upper portion of the cooling plate 400 in the form of a gel or the like before the cell assembly 100 is placed. In this case, the air layer between the cell assembly 100 and the cooling plate 400 may be eliminated more securely.

In particular, the thermal interface material may be a thermal bond. In this configuration of the present disclosure, the heat transfer efficiency is enhanced by means of the thermal bond, and also the coupling between the cooling plate 400 and the cell assembly 100 may be improved further. In addition, since the standing state of the plurality of battery cells 111 may be stably maintained by means of the thermal bond while the battery module is being assembled, the battery module may be assembled more easily.

Meanwhile, as shown in FIG. 6, the cooling plate 400 may have a height corresponding to the height of the plurality of battery cell groups 110a, 110b.

Accordingly, as the cooling plate 400 and the end plates 200a, 200b are spaced apart, a spacing (b) may be formed between the cooling plate 400 and the end plates 200a, 200b. Here, the spacing (b) may have a step as much as a half of the height of the battery cell, similar to the accommodating space (a) described above.

In other words, the spacing (b) having the same width as the cooling plate 400 and having a height as much as a half of the height of the battery cell may be formed between the cooling plates 400 and the end plates 200a, 200b located at both sides.

Hereinafter, the arrangement of the spacing (b) as described above will be explained.

The battery module according to the present disclosure may further include a coupling unit 500.

The coupling unit 500 may be located in the spacing (b) formed between the end plate 200 and the cooling plate 400 to play a role of coupling the end plate 200 and the cooling plate 400.

In more detail, the coupling unit 500 may be formed to have a rectangular shape elongating in a horizontal direction to correspond to the shape of the spacing (b) described above.

The coupling unit 500 may be made of a metal material such as steel. Also, the surface of the coupling unit 500 facing the end plate 200 may be welded to the end plate 200, and the surface of the coupling unit 500 facing the cooling plate 400 may be welded to the cooling plate 400.

At this time, coupling unit 500 may be welded between the end plate 200 and the cooling plate 400 by means of friction stir welding, respectively.

In this configuration of the present disclosure, it is possible to prevent internal components of the battery module from being damaged or broken due to heat or deformation during the welding process. In other words, if a certain level of heat is applied to the battery cell 111 included in the cell assembly 100, the pouch exterior, the electrode plate, the separator or the like may be damaged. However, if the friction stir welding is applied, since the heat input is not higher than other welding methods, it is possible to prevent the battery cell 111 from being damaged.

In addition, since the friction stir welding minimizes the residual stress and thermal deformation compared to existing welding methods, mechanical properties of the welding portion may be improved. For example, the friction stir welding may secure strength up to 90% of the base material strength. Accordingly, in the battery module according to this embodiment of the present disclosure, the coupling strength among the end plate 200, the cooling plate 400 and the coupling unit 500 may be stably secured.

Figure 8:
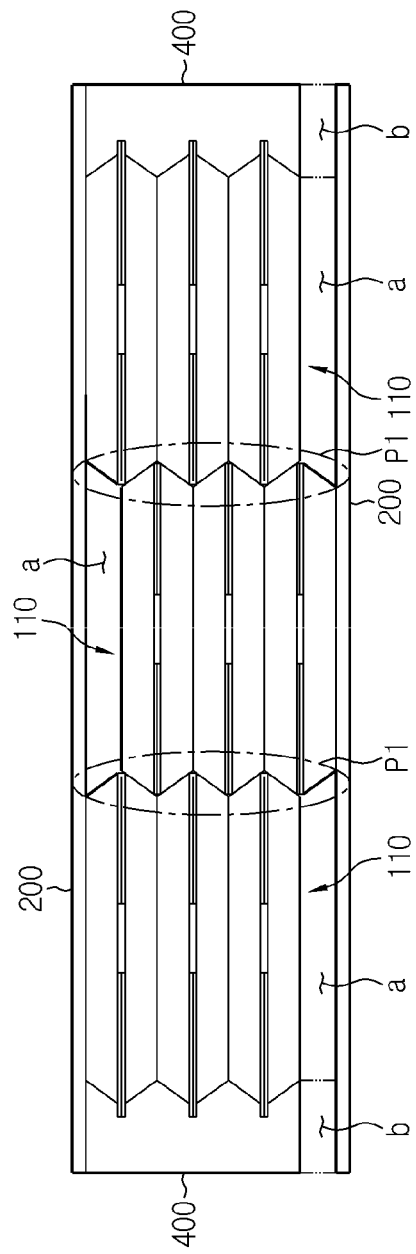
FIG. 8 is a front view showing a battery module according to another embodiment.

Meanwhile, FIG. 8 is a front view showing a battery module according to another embodiment.

Referring to FIG. 8, the battery module according to another embodiment has the same structure and function as the battery module according to the former embodiment, but, three battery cell groups 110 are included in the cell assembly 100, unlike the battery module of the former embodiment.

At this time, even though the battery cells of the battery cell group 110 located at both sides have the sealing portion S only at a surface contacting the cooling plate 400, like the battery cell depicted in FIG. 4, the battery cell of the battery cell group 110 located at the center may not have the sealing portion at both right and left surfaces thereof.

Accordingly, the protrusions P1 of the battery cell groups 110 located at both sides may be in closely contact with the protrusions P1 of the battery cell group 110 located at the middle portion to support each other.

By doing so, three accommodating spaces (a) may be formed between the battery cell group 110 and the end plate 200 of the battery module of this embodiment, and the accommodating space (a) may accommodate the elastic component and the sensing component as described above.

Figure 9:
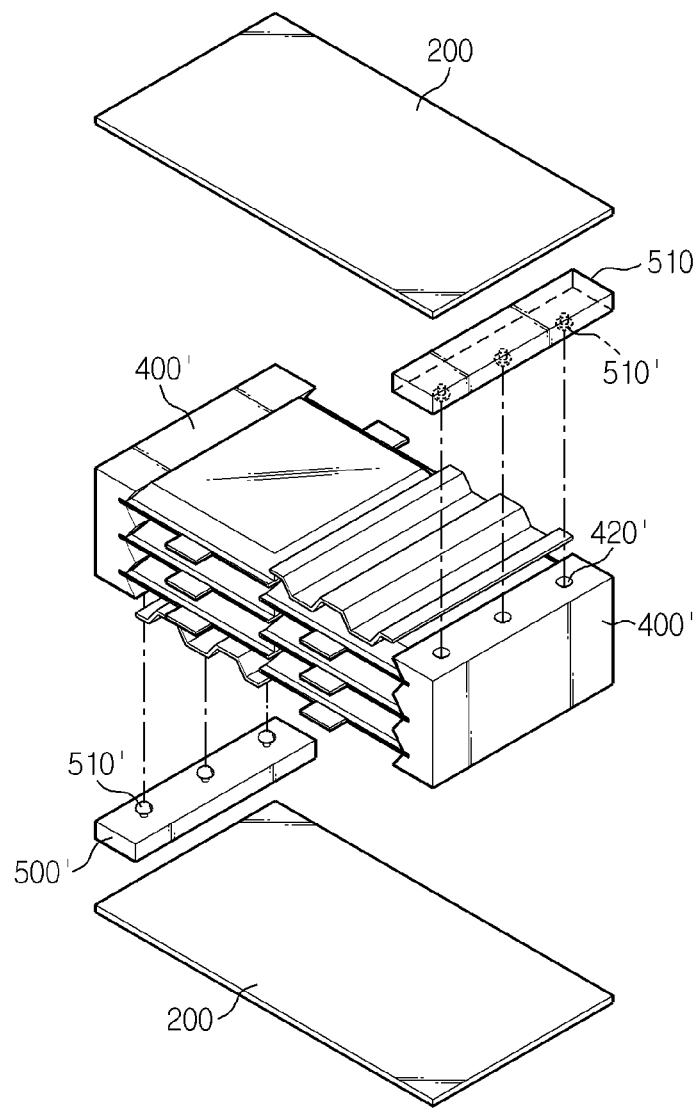
FIG. 9 is an exploded perspective view showing a battery module according to another embodiment of the present disclosure.
Figure 10:
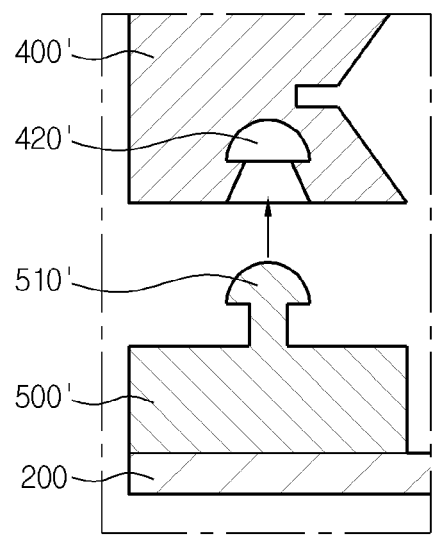
FIGS. 10 and 11 are diagrams showing the cooling plate and the coupling unit according to another embodiment of the present disclosure before and after being coupled.
Figure 11:
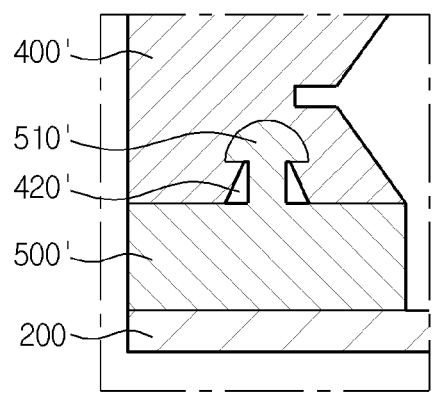

Meanwhile, FIG. 9 is an exploded perspective view showing a battery module according to another embodiment of the present disclosure, and FIGS. 10 and 11 are diagrams showing the cooling plate and the coupling unit according to another embodiment of the present disclosure before and after being coupled.

Referring to FIGS. 9 to 11, the battery module according to another embodiment may have the same configuration and role as the battery module of the former embodiment, but a cooling plate 400' and a coupling unit 500' may be coupled in a different way.

In more detail, the cooling plate 400' of the battery module according to another embodiment may have a coupling groove 420' formed to be recessed inwards, into which a coupling protrusion 510' of the coupling unit 500', explained later, is inserted.

The coupling groove 420' may be formed at a surface of the coupling unit 500' that faces the cooling plate 400', at a location corresponding to the coupling protrusion 510'. In addition, as shown in FIG. 10, the coupling groove 420' may be shaped to have an entrance whose diameter is gradually decreased at an entrance thereof and then increased in an inner direction, so that the coupling protrusion 510' is not separated outwards after being inserted therein.

By doing so, the coupling protrusion 510' moved toward the coupling groove 420' and pressed and inserted therein in an upper and lower direction may be inserted into an end of the coupling groove 420' by means of the pressing pressure. Accordingly, the coupling protrusion 510' inserted into the end of the coupling groove 420' is hooked by a hooking portion of the coupling groove 420', and thus it is possible to prevent the coupling protrusion 510' from being deviated from the coupling groove 420' even though an external force is applied in a direction opposite to the inserting direction of the coupling protrusion 420'.

In this configuration of the present disclosure, since the coupling unit 500' and the cooling plate 400' are coupled just by simply moving and pressing the coupling unit 500' and the cooling plate 400' vertically, the battery module may be manufactured within a shorter time.

The present disclosure can be substituted, modified or changed in various ways without departing from the scope of the present disclosure by those skilled in the art and thus is not limited to the above embodiments and the accompanying drawings.

| Reference Signs | |
|---|---|
| 100: cell assembly | 110: battery cell group |
| 111: battery cell | 200: end plate |
| 300: elastic component | 400: cooling plate |
| 500: coupling unit | a: accommodating space |
| b: spacing | P1, P2: protrusion |

What is claimed is:

1. A battery module, comprising:

a cell assembly including a plurality of battery cell groups, in each of which a plurality of battery cells respectively having protrusions protruding in a left and right direction on at least one of one end and the other end thereof are stacked in an upper and lower direction, wherein the protrusion of any one battery cell group among the plurality of battery cell groups is inserted and coupled between the protrusions of another battery cell group, wherein a step is formed between adjacent battery cell groups in an upper and lower direction, wherein the one battery cell group and the another battery cell group are adjacent to each in the left and right direction, and the battery cells of the one battery cell group are stacked separately from the battery cells of the another battery cell group and are in parallel to each other in the upper and lower direction; and end plates respectively disposed at upper and lower portions of the cell assembly.

2. The battery module according to claim 1, wherein an accommodating space is formed between the plurality of battery cells groups and the end plate due to the step.

3. The battery module according to claim 2, further comprising:

an elastic component accommodated in the accommodating space and buffering a pressure applied by the volume increase of the plurality of battery cells.

4. The battery module according to claim 2, wherein the accommodating space is half a thickness of one of the battery cells.

5. The battery module according to claim 1, further comprising:

a sensing component accommodated in the accommodating space and sensing a voltage of the plurality of battery cells.

6. The battery module according to claim 1, further comprising:

a cooling plate disposed at a side surface of the cell assembly to stand in an upper and lower direction.

7. The battery module according to claim 6, wherein the cooling plate has a groove formed at an inner surface thereof that comes into contact with the cell assembly, and the groove has a shape corresponding to the protrusion so that the protrusion is inserted therein.

8. The battery module according to claim 6, further comprising:

a coupling unit located in a spacing formed between the end plate and the cooling plate and coupling the end plate and the cooling plate.

9. The battery module according to claim 1, wherein a space formed between the protrusions of any one battery cell group among the plurality of battery cell groups and the protrusion of another battery cell group adjacent to the any one battery cell group are shaped to correspond to each other.

10. The battery module according to claim 1, wherein the protrusion is formed to protrude further from an upper or lower end of each of the plurality of battery cells toward a center thereof.

11. The battery module according to claim 1, wherein the protrusion is formed so that upper and lower portions thereof are symmetric in an upper and lower direction based on a center of each of the plurality of battery cells.

12. The battery module according to claim 1, wherein the protrusions of the adjacent battery cell groups are offset by half a thickness of one of the battery cells in the upper and lower direction.

* * * * *